United States Patent
Kleza et al.

(10) Patent No.: US 10,365,177 B2
(45) Date of Patent: Jul. 30, 2019

(54) SYSTEMS AND METHODS FOR CALIBRATING A TOOL

(71) Applicant: Hamilton Sundstrand Corporation, Charlotte, NC (US)

(72) Inventors: Charles R. Kleza, Wethersfield, CT (US); Andrew P. Davidson, Rockford, IL (US); John B. Engel, Stamford, VT (US); David J. Coache, Enfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/670,751

(22) Filed: Aug. 7, 2017

(65) Prior Publication Data

US 2018/0045595 A1    Feb. 15, 2018

Related U.S. Application Data

(60) Provisional application No. 62/372,568, filed on Aug. 9, 2016.

(51) Int. Cl.
   *G01L 25/00*    (2006.01)
   *B25B 23/142*   (2006.01)
   (Continued)

(52) U.S. Cl.
   CPC ........ *G01L 25/003* (2013.01); *B25B 23/1425* (2013.01); *F04D 29/042* (2013.01); *G06F 3/018* (2013.01)

(58) Field of Classification Search
   CPC . B25B 23/1425; F04D 29/042; G01L 25/003; G06F 3/018
   See application file for complete search history.

(56) References Cited

U.S. PATENT DOCUMENTS 4,219,920 A    9/1980 Eshghy
4,245,381 A *  1/1981 Eshghy ................. B23P 19/066
                                                  173/183

(Continued)

OTHER PUBLICATIONS

Partial European Search Report dated Jan. 16, 2018 issued during the prosecution of corresponding European Patent Application No. EP 17184501.9 (11 pages).

(Continued)

*Primary Examiner* — Francis C Gray
(74) *Attorney, Agent, or Firm* — Locke Lord LLP; Scott D. Wofsy; Alicia J. Carroll

(57) ABSTRACT

A calibration system includes a housing, a drive shaft within the housing, a load application apparatus operatively connected to the drive shaft to apply a force to the drive shaft, and a plurality of housing transducers operatively connected to the drive shaft to measure at least one of an in-line torque or a prevailing torque of the drive shaft. A method for calibrating a tool includes generating at least one of a pass or fail output from a processing unit based on whether a variance between a prevailing torque from a tool transducer and a prevailing torque from an external tool is within a predetermined variance threshold. A method for measuring prevailing torque in a tool includes determining whether a prevailing torque value is within a predetermined prevailing torque range and adjusting a shut-off threshold torque based on the prevailing torque.

12 Claims, 3 Drawing Sheets

(51) Int. Cl.
*F04D 29/042* (2006.01)
*G06F 3/01* (2006.01)

(56) References Cited

U.S. PATENT DOCUMENTS

| | | | | | |
|---|---|---|---|---|---|
| 4,245,382 | A | * | 1/1981 | Eshghy | B23P 19/066 173/183 |
| 4,483,177 | A | * | 11/1984 | McIntyre | G01L 25/003 73/1.11 |
| 5,591,919 | A | | 1/1997 | Hathaway et al. | |
| 6,151,957 | A | * | 11/2000 | Enarson | G01N 9/34 73/53.03 |
| 8,108,158 | B2 | | 1/2012 | Hetzel | |
| 2014/0283621 | A1 | * | 9/2014 | Brathe | G01L 3/1428 73/862.31 |

OTHER PUBLICATIONS

Extended European Search Report dated May 2, 2018 issued during the prosecution of European Patent Application No. 17184501.9 (10 pages).
European Office Action dated Apr. 25, 2019 issued in corresponding EPO Application No. 17184501.9.

* cited by examiner

SYSTEMS AND METHODS FOR CALIBRATING A TOOL

CROSS-REFERENCE TO RELATED APPLICATIONS

This application claims priority to U.S. Provisional Patent Application No. 62/372,568 filed Aug. 9, 2016, which is incorporated by reference herein in its entirety.

BACKGROUND OF THE INVENTION

1. Field of the Invention

The present invention relates to tools, in particular to tools such as torque wrenches.

2. Description of Related Art

Present calibration methods for hand tools, such as torque wrenches, assume that the calibration with respect to the overall torque of the tool also calibrates with respect to prevailing torque. There is no current method to measure prevailing torque at a given value and then calibrate an automatic torque tool to that given value to ensure the automatic torque tool is providing correct data. Moreover, traditional software for the tool, e.g. the torque wrench, provides only target and final torque values and does not currently provide a prevailing torque measurement.

Such conventional methods and systems have generally been considered satisfactory for their intended purpose. However, there is still a need in the art for systems and methods that allow for improved calibration of torque wrenches. The present invention provides a solution for these problems.

SUMMARY OF THE INVENTION

A calibration system includes a housing and a drive shaft within the housing. The drive shaft extends to a connection point on a wall of the housing. The calibration system includes a load application apparatus operatively connected to the drive shaft to apply a force to the drive shaft. The calibration system includes a plurality of housing transducers operatively connected to the drive shaft to measure at least one of an in-line torque or a prevailing torque of the drive shaft.

In accordance with some embodiments, the calibration system includes a processing unit operatively connected to at least one of the plurality of housing transducers to provide a pass/fail output. The pass/fail output can be based on a comparison between the prevailing torque measurement from at least one of the housing transducers and a prevailing torque measurement from an external tool. It is contemplated that in certain embodiments, the calibration system includes a selectively removable tool operatively connected to the connection point on the wall of the housing to apply a torque to the drive shaft. The selectively removable tool can include a tool transducer to determine at least one of an in-line torque and a prevailing torque being applied to the drive shaft by the selectively removable tool.

The tool transducer can be operatively connected to a processing unit that is operatively connected to at least one of the plurality of housing transducers. The processing unit can provide a pass/fail output based on a comparison between the prevailing torque measurement from at least one of the plurality of housing transducers and the prevailing torque measurement from the tool transducer.

In accordance with another aspect, a method for calibrating a tool includes applying a torque to a drive shaft within a test-cart housing with a load application apparatus. The method includes connecting a selectively removable tool to the drive shaft through a connection point on a wall of the test-cart housing to apply a torque to the drive shaft, and determining the prevailing torque being applied to the drive shaft by the selectively removable tool with a tool transducer operatively connected to the selectively removable tool. The method includes determining the prevailing torque being applied to the drive shaft by the load application apparatus with a test transducer operatively connected to the drive shaft.

The method includes comparing the prevailing torque being applied by the selectively removable tool to the prevailing torque being applied by the load application apparatus using a processing unit operatively connected to at least one of the test transducer or the tool transducer to determine a variance between the prevailing torque being applied by the selectively removable tool and the prevailing torque being applied by the load application apparatus. The method includes generating at least one of a pass or fail output from the processing unit based on whether the variance is within a predetermined variance threshold. It is contemplated that in some embodiments, the method can include calibrating the selectively removable tool if a fail output is generated.

In accordance with another aspect, a method for measuring prevailing torque in a tool includes applying torque using a tool until a trigger torque threshold value is met in a torque transducer, and measuring torque data recorded by the torque transducer until the trigger torque threshold value is met. The method includes evaluating torque data recorded by the torque transducer during applying the torque prior to the trigger torque threshold value to determine a prevailing torque value, and determining whether the prevailing torque value is within a predetermined prevailing torque range. The method includes signaling at least one of pass or fail depending on whether the prevailing torque is within the prevailing torque range. The method includes adjusting a shut-off threshold torque based on the prevailing torque.

The method can include shutting off the tool if fail is signaled. The method can include applying additional torque using the tool until the shut-off threshold torque is met if pass is signaled. In accordance with some embodiments, the method includes adjusting at least one of a minimum shut-off torque or a maximum shut-off torque. Evaluating the torque data recorded by the torque transducer during applying the torque can include evaluating the torque data over a predetermined torque evaluation angle range.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
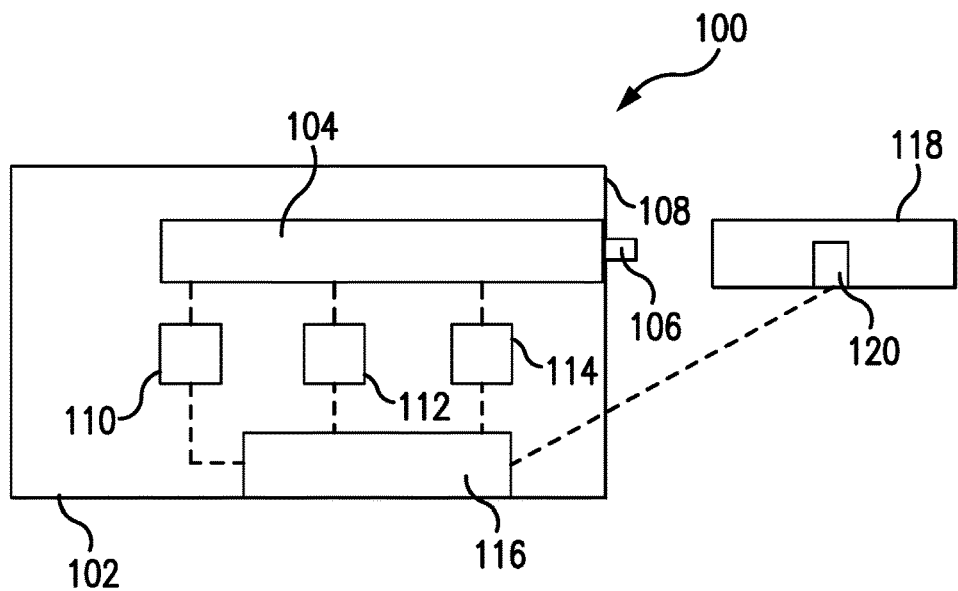
FIG. 1 is a schematic depiction of an exemplary embodiment of a calibration system constructed in accordance with an embodiment of the present disclosure.

Reference will now be made to the drawings wherein like reference numerals identify similar structural features or aspects of the subject disclosure. For purposes of explanation and illustration, and not limitation, a schematic depiction of an exemplary embodiment of a calibration system constructed in accordance with the disclosure is shown in FIG. 1 and is designated generally by reference character 100. Other embodiments of calibration systems, methods for calibrating a tool, and/or methods for measuring prevailing torque in a tool in accordance with the disclosure, or aspects thereof, are provided in FIGS. 2-4, as will be described.

As shown in FIG. 1, a calibration system 100 includes a housing 102 and a drive shaft 104 within housing 102. Calibration system 100 is a dynamic calibration system. Drive shaft 104 extends to a connection point 106 on a wall 108 of housing 102. Calibration system 100 includes a load application apparatus 110 operatively connected to drive shaft 104 to apply a force to drive shaft 104, e.g. a rotational force. Calibration system 100 includes a plurality of housing transducers 112 and 114 operatively connected to drive shaft 104 to measure at least one of an in-line torque or a prevailing torque of drive shaft 104.

With continued reference to FIG. 1, calibration system 100 includes a processing unit 116 operatively connected to at least one of housing transducers 112 and 114 to provide a pass or fail output. Transducers 112 and 114 can be wirelessly connected, hard-wired, or the like to processing unit 116 and/or drive shaft 104. The pass or fail output is based on a comparison between the prevailing torque measurement from at least one of housing transducers 112 and 114 and a prevailing torque measurement from an external tool 118. It is contemplated that in certain embodiments, calibration system 100 includes a selectively removable tool 118 operatively connected to connection point 106 on wall 108 of housing 102 to apply a torque to drive shaft 104. Selectively removable tool 118 can be an automatic torque wrench or the like.

As shown in FIG. 1, selectively removable tool 118 includes a tool transducer 120 to determine at least one of an in-line torque and a prevailing torque being applied to drive shaft 104 by selectively removable tool 118. Tool transducer 120 is operatively connected to processing unit 116. Tool transducer 120 can be wirelessly connected, hard-wired, or the like, to processing unit 116. Processing unit 116 provides one of a pass or fail output based on a comparison between the prevailing torque measurement from at least one of housing transducers 112 and 114 and the prevailing torque measurement from tool transducer 120.

Figure 2:
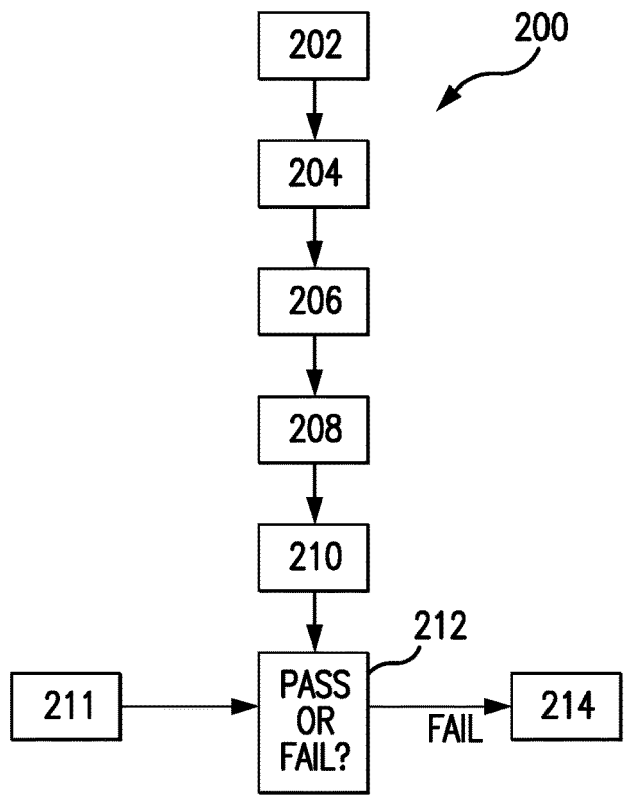
FIG. 2 is a flow chart schematically depicting a method for calibrating a tool in accordance with an embodiment of the present disclosure.

As shown in FIG. 2, a method 200 for calibrating a tool, e.g. tool 118, includes applying a torque to a drive shaft, e.g. drive shaft 104, within a test-cart housing, e.g. housing 102, with a load application apparatus, e.g. load application apparatus 110, indicated schematically by box 202. Method 200 includes connecting the tool to the drive shaft through a connection point, e.g. connection point 106, on a wall of the test-cart housing to apply a torque to the drive shaft, indicated schematically by box 204. Method 200 includes determining the prevailing torque being applied to the drive shaft by the tool with a tool transducer, e.g. tool transducer 120, operatively connected to the selectively removable tool, indicated schematically by box 206. Method includes determining the prevailing torque being applied to the drive shaft by the load application apparatus with a test transducer, e.g. one of housing transducers 112 and 114, operatively connected to the drive shaft, indicated schematically by box 208. Prevailing torque being applied to the drive shaft determined with either the test transducer or the tool transducer can be determined using method 300, described below.

With continued reference to FIG. 2, method 200 includes comparing the prevailing torque being applied to the drive shaft by the selectively removable tool to the prevailing torque being applied to the drive shaft by the load application apparatus using a processing unit, e.g. processing unit 116, operatively connected to at least one of the test transducer or the tool transducer to determine a variance between the prevailing torque being applied by the selectively removable tool and the prevailing torque being applied by the load application apparatus, indicated schematically by box 210. Method 200 includes generating at least one of a pass or fail output from the processing unit based on whether the variance is within a predetermined variance threshold, indicated schematically by box 212. The predetermined variance threshold is a predetermined value stored in a database and selected based on the characteristics of pieces being joined together, e.g. the stack-up. The input of the predetermined variance threshold is indicated schematically by box 211. Method 200 includes calibrating the selectively removable tool if a fail output is generated, indicated schematically by box 214.

Figure 3:
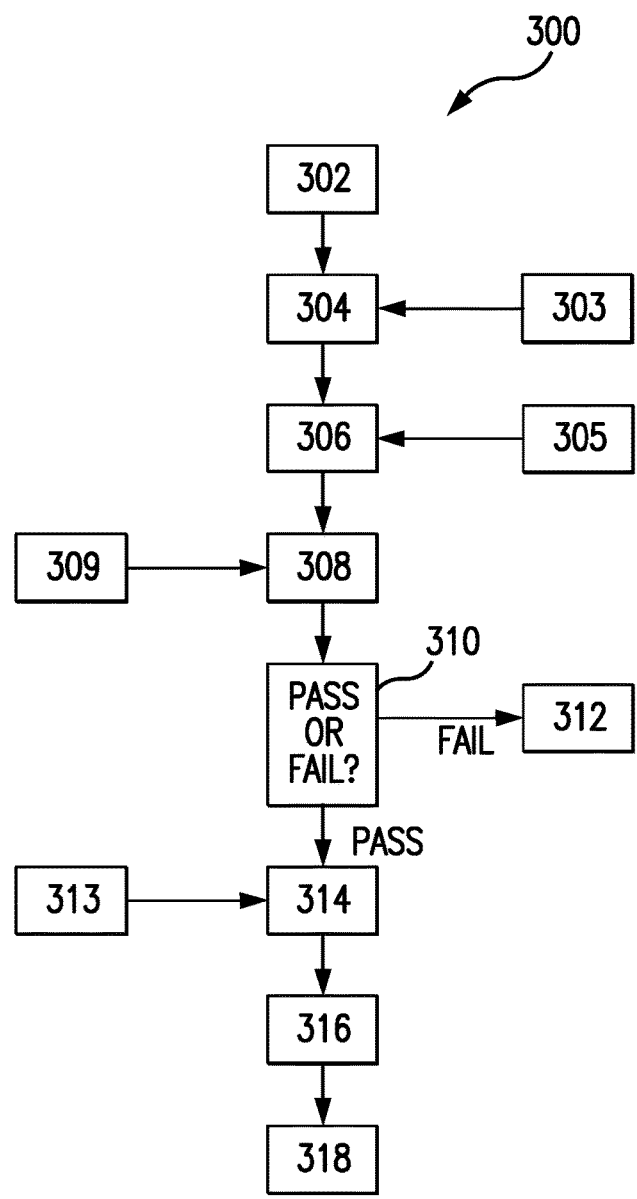
FIG. 3 is a flow chart schematically depicting a method for measuring prevailing torque in a tool in accordance with an embodiment of the present disclosure.

As shown in FIG. 3, a method 300 for measuring prevailing torque in a tool, e.g. tool 118, includes applying torque to a fastener, for example, using the tool until a trigger torque threshold value is met in a torque transducer, e.g. tool transducer 120, indicated schematically by box 302. Method 300 includes measuring torque data recorded by the torque transducer until the trigger torque threshold value is met, indicated schematically by box 304. The trigger torque threshold value is a predetermined value stored in a database and selected based on the stack-up. The input of the trigger torque threshold is indicated schematically by box 303. Method 300 includes evaluating torque data recorded by the torque transducer during applying the torque prior to meeting the trigger torque threshold value to determine a prevailing torque value, indicated schematically by box 306. Evaluating the torque data recorded by the torque transducer during applying the torque includes evaluating the torque data over a predetermined prevailing torque evaluation angle range. The prevailing torque evaluation angle range is a predetermined value stored in a database and selected based on the stack-up. The input of the predetermined prevailing torque evaluation angle range is indicated schematically by box 305. This input also includes a predetermined angle offset, e.g. the amount of angle to look back from the trigger torque threshold value to get to the top end of the predetermined prevailing torque evaluation angle range, as shown in more detail in FIG. 4. This predetermined angle offset can also be based on the characteristics of the stack up.

With continued reference to FIG. 3, method 300 includes determining whether the prevailing torque value is within a predetermined prevailing torque range, indicated schematically by box 308. The prevailing torque range is a predetermined value stored in a database and selected based on the stack-up. The input of the prevailing torque range is indicated schematically by box 309. Method 300 includes signaling at least one of "pass" or "fail" depending on whether the prevailing torque is within the prevailing torque range, indicated schematically by box 310. If "fail" is signaled, method 300 includes shutting off the tool, indicated schematically by box 312. If "pass" is signaled, method 300 includes applying additional torque using the tool until a shut-off threshold is met, indicated schematically by box 314. The shut-off threshold is a predetermined value stored in a database and selected based on the stack-up. The input of the shut-off threshold is indicated schematically by box 313. Method 300 includes adjusting the shut-off threshold based on the prevailing torque, indicated schematically by box 316. Method 300 includes adjusting minimum and maximum shut-off torques based on the prevailing torque, indicated schematically by 318.

Method 300 provides a more consistent prevailing torque measurement to be used in compensating for the shut-off threshold, as compared with traditional systems that use angle rotation data to identify prevailing torque data, as the angle rotation data is not always repeatable and thus can result in different readings. Method 300 can be used to determine the prevailing torque being applied to the drive shaft, as described above with respect to boxes 206 and/or 208.

Figure 4:
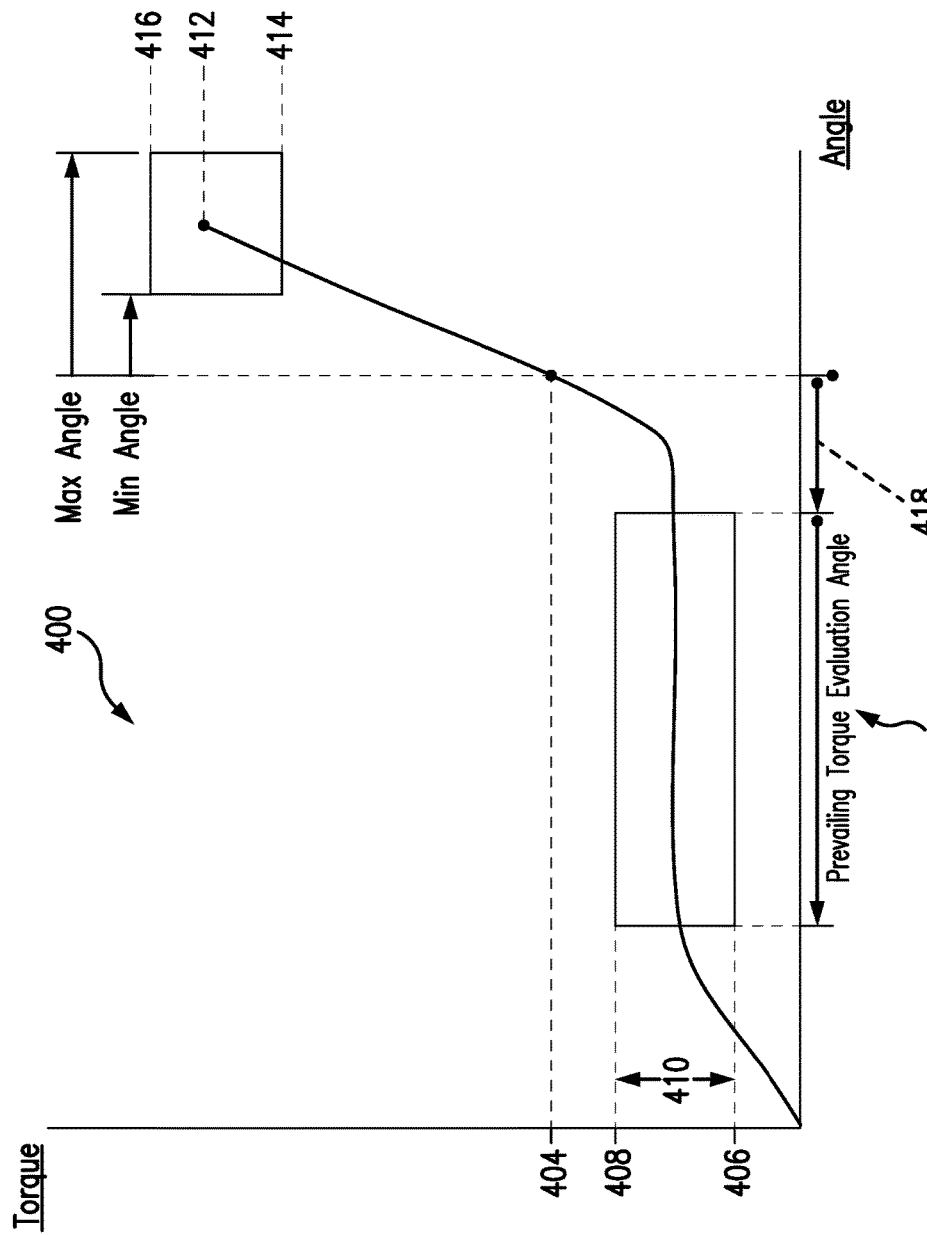
FIG. 4 is a schematic depiction of a plot of torque versus angle recorded by a transducer showing the predetermined torque evaluation angle range in accordance with an embodiment of the present disclosure.

With reference now to FIG. 4, a plot of torque versus angle 400 recorded by a transducer shows the predetermined prevailing torque evaluation angle range 402. Minimum and maximum prevailing torques 406 and 408, respectively, represent the low and high ends of a prevailing torque range 410. Trigger torque 404 typically occurs when the parts, e.g. fastener and stack-up, begin to compress together. A predetermined angle offset 418 is the amount of angle to look back from trigger torque 404 to get to the top end of predetermined prevailing torque evaluation angle range 402. A shut-off threshold 412 is represented by a point in between a minimum shut-off torque 414 and a maximum shut-off torque 416. Minimum and maximum shut-off torques 414 and 416, respectively, are predetermined depending on the stack-up and can be adjusted as needed based on the prevailing torque measurement and/or shut-off threshold 412.

The methods and systems of the present disclosure, as described above and shown in the drawings, systems and methods for determining prevailing torque and calibrating torque wrenches with superior properties, including more accurate calibration and in-use measurements, resulting in improved tool performance. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A calibration system comprising:
   a housing;
   a drive shaft within the housing extending to a connection point on a wall of the housing;
   a load application apparatus operatively connected to the drive shaft to apply a force to the drive shaft; and
   a plurality of housing transducers operatively connected to the drive shaft to measure a prevailing torque of the drive shaft.

2. The calibration system as recited in claim 1, further comprising a processing unit operatively connected to at least one of the plurality of housing transducers to provide a pass/fail output based on a comparison between the prevailing torque measurement from at least one of the housing transducers and a prevailing torque measurement from an external tool.

3. The calibration system as recited in claim 1, further comprising a selectively removable tool operatively connected to the connection point on the wall of the housing to apply a torque to the drive shaft.

4. The calibration system as recited in claim 3, wherein the selectively removable tool includes a tool transducer to determine at least one of an in-line torque and a prevailing torque being applied to the drive shaft by the selectively removable tool.

5. The calibration system as recited in claim 4, wherein the tool transducer is operatively connected to a processing unit operatively connected to at least one of the plurality of housing transducers, wherein the processing unit provides a pass/fail output based on a comparison between the prevailing torque measurement from at least one of the plurality of housing transducers and the prevailing torque measurement from the tool transducer.

6. A method for calibrating a tool, comprising:
   applying a torque to a drive shaft within a test-cart housing with a load application apparatus;
   connecting a selectively removable tool to the drive shaft through a connection point on a wall of the test-cart housing to apply a torque to the drive shaft;
   determining a prevailing torque being applied to the drive shaft by the selectively removable tool with a tool transducer operatively connected to the selectively removable tool;
   determining the prevailing torque being applied to the drive shaft by the load application apparatus with a test transducer operatively connected to the drive shaft;
   comparing the prevailing torque being applied to the drive shaft by the selectively removable tool to the prevailing torque being applied to the drive shaft by the load application apparatus using a processing unit operatively connected to at least one of the test transducer or the tool transducer to determine a variance between the prevailing torque being applied by the selectively removable tool and the prevailing torque being applied by the load application apparatus; and
   generating one of a pass or fail output from the processing unit based on whether the variance is within a predetermined variance threshold.

7. The method as recited in claim 6, calibrating the selectively removable tool if a fail output is generated.

8. A method for measuring prevailing torque in a tool, comprising:
   applying torque using a tool until a trigger torque threshold value is met in a torque transducer;
   measuring torque data recorded by the torque transducer until the trigger torque threshold value is met;
   evaluating torque data recorded by the torque transducer during applying the torque prior to the trigger torque threshold value to determine a prevailing torque value;
   determining whether the prevailing torque value is within a predetermined prevailing torque range;
   signaling at least one of pass or fail depending on whether the prevailing torque is within the prevailing torque range; and
   adjusting a shut-off threshold torque based on the prevailing torque.

9. The method as recited in claim 8, further comprising shutting off the tool if fail is signaled.

10. The method as recited in claim 8, further comprising applying additional torque using the tool until the shut-off threshold torque is met if pass is signaled.

11. The method as recited in claim 8, further comprising adjusting at least one of a minimum shut-off torque or a maximum shut-off torque.

12. The method as recited in claim 8, wherein evaluating the torque data recorded by the torque transducer during applying the torque includes evaluating the torque data over a predetermined torque evaluation angle range.

\* \* \* \* \*